United States Patent [19]
Thompson et al.

[11] 4,285,908
[45] Aug. 25, 1981

[54] CATALYST REGENERATION APPARATUS

[75] Inventors: Gregory J. Thompson, Waukegan; Anthony G. Vickers, Arlington Heights, both of Ill.

[73] Assignee: UOP Inc., Des Plaines, Ill.

[21] Appl. No.: 101,295

[22] Filed: Dec. 7, 1979

Related U.S. Application Data

[63] Continuation-in-part of Ser. No. 908,301, May 22, 1978, Pat. No. 4,197,189.

[51] Int. Cl.³ .............................. B01J 8/32; B01J 8/44; F27B 15/08; F27B 15/10
[52] U.S. Cl. .................................. 422/143; 422/144; 422/145
[58] Field of Search ............................... 422/143–145, 422/147; 252/417; 208/164

[56] References Cited

U.S. PATENT DOCUMENTS

| | | | |
|---|---|---|---|
| 2,515,156 | 7/1950 | Jahnig et al. | 208/164 |
| 3,707,580 | 12/1972 | Anderson | 422/145 |
| 3,844,973 | 9/1976 | Stine | 252/417 |
| 3,893,812 | 9/1976 | Conner et al. | 23/288 B |
| 3,909,392 | 10/1976 | Horecky | 252/417 |
| 4,032,305 | 6/1977 | Squires | 422/145 |

FOREIGN PATENT DOCUMENTS 2526839  8/1976  Fed. Rep. of Germany ............ 252/417

Primary Examiner—Bradley Garris
Attorney, Agent, or Firm—James R. Hoatson, Jr.; Louis A. Morris; William H. Page, II

[57] ABSTRACT

A catalyst regeneration apparatus for the oxidation of coke from a spent catalyst, said coke being converted to CO, and for the conversion of the CO to $CO_2$. Hot regenerated catalyst is recycled from a dense bed in the regeneration zone to mix with incoming spent catalyst in a mixer zone. The mixer zone operates in dense phase and is supplied with a relatively small amount of a fluidizing medium, preferably air. After the mixing of spent and fresh catalyst is substantially completed, a relatively large amount of a regenerating gas, preferably air, is admixed with the catalyst mixture, and some coke oxidation occurs. The balance of coke oxidation takes place in a downstream-situated regeneration zone of substantially conventional design. There is a transfer section connecting the mixer zone to the regeneration zone through which the relatively large amount of the regenerating gas is admitted. The transfer section is preferably a frustoconical surface, the horizontal cross section of smallest perimeter of which adjoins the outlet of said mixer zone, and regenerating gas addition is made at the base of the transfer section in order to provide a venturi effect which ensures good air-catalyst mixing.

1 Claim, 3 Drawing Figures

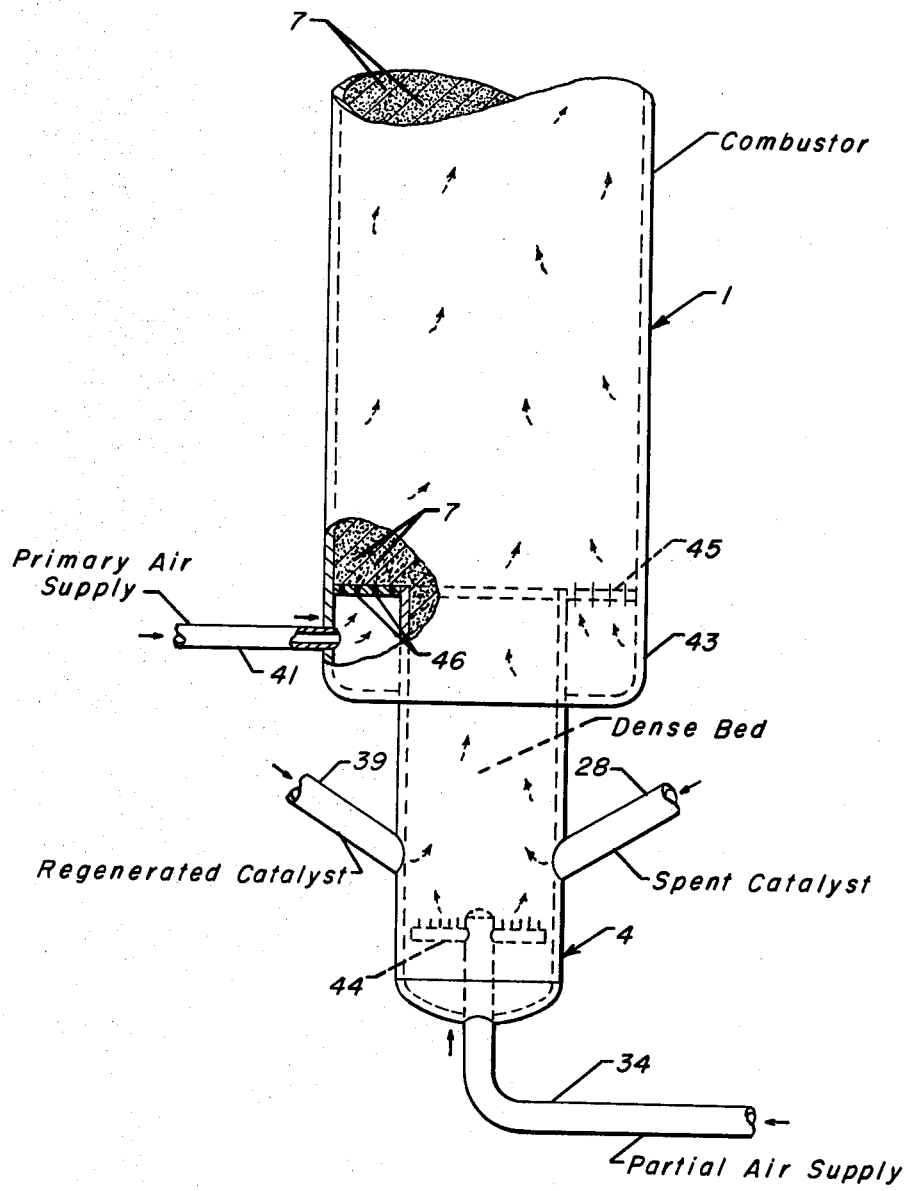

CATALYST REGENERATION APPARATUS

CROSS-REFERENCE TO RELATED APPLICATION

This application is a continuation-in-part application of our prior, copending application Ser. No. 908,301 filed May 22, 1978 and issued as U.S. Pat. No. 4,197,189, on Apr. 8, 1980 which application is incorporated herein by reference thereto.

BACKGROUND OF THE INVENTION

1. Field of the Invention

The field of art to which this invention pertains is catalyst regeneration. The present invention will be most useful in a process for regenerating spent FCC catalyst, but should be useful in any process wherein coke is burned from a solid, particulated, fluidizable catalyst.

2. Description of the Prior Art

Much of the world's crude oil is subjected to fluid catalytic cracking (hereafter FCC) processes to convert the heavier material into lighter products. The fluid catalyst used in these processes is quickly contaminated with coke, and to permit the reuse of the catalyst in the process the coke must be burned from the catalyst. Thus there is usually associated with every FCC process unit a fluid catalyst regenerator.

In the past, the catalyst regenerators have burned coke from the catalyst by adding air to a single regeneration zone. Coke was burned to provide a mixture of carbon monoxide and carbon dioxide. Regeneration was usually incomplete, because adding the stoichiometric requirement of air to the catalyst regeneration zone invariably resulted in considerable oxidation of carbon monoxide to carbon dioxide, usually in an upper portion of the regeneration vessel where no catalyst was available to act as a heat sink. This burning of carbon monoxide to carbon dioxide, often called "afterburning", resulted in extremely high temperatures which could damage the regenerator, hence air addition was restricted to protect the apparatus.

Recently, there have been attempts made to promote combustion of CO within the regenerator to recover the heat liberated by this combustion, to permit use of this heat in the FCC process and to permit more thorough regeneration of the catalyst.

Examples of these recent regeneration processes are Stine et al U.S. Pat. No. 3,844,973 and Horecky, Jr. et al U.S. Pat. No. 3,909,392, the teachings of both of which patents are incorporated by reference.

In the catalyst regeneration apparatus of Conner et al, U.S. Pat. No. 3,893,812 (U.S. Class 23/288 B), the teachings of which are incorporated herein by reference, an improved regenerator design is disclosed. A first intermediate density zone or combustor, i.e. a zone containing fluid catalyst of intermediate density, receives spent catalyst and air, permitting most of the coke to be burned therein. Catalyst and regeneration gases, and CO produced during coke combustion, are then passed upwardly through a dilute-phase transport riser wherein significant amounts of the CO are burned to $CO_2$. Finally the regenerated catalyst is collected in a second dense bed. This process provides for recycle of a portion of the hot regenerated catalyst from the second dense bed to the combustor via an external catalyst recycle means. The function of catalyst recycle is to increase the temperature in the combustor and increase the rate of coke oxidation. It is also known to provide for internal catalyst recirculation from the second dense bed to the combustor.

Another example of a process operating with two dense beds of catalyst, separated by a dilute phase transport riser, is German OS No. 25 26 839, corresponding to U.S. Ser. No. 479,726, filed June 17, 1974 (Class 252), the teachings of which are incorporated by reference. In this reference hot regenerated catalyst from the second dense bed is admixed with spent catalyst from the FCC reactor in a riser beneath the first dense bed or combustor of the FCC regenerator. Dilute-phase conditions are maintained in the riser (item 34 in the drawing of the U.S. application) by the addition of sufficient air. The dilute-phase condition is indicated on the drawing, and would also be expected as most FCC technologists design risers for dilute-phase conditions.

We have discovered that significantly improved operation is possible by separating and optimizing the desired operations which occur at the inlet to the catalyst regenerator. Refiners are trying to do two things, to mix hot regenerated catalyst with relatively cooler spent catalyst, and also to mix spent catalyst with air. The former ensures that the catalyst is supplied to the combustor at a uniform temperature with a uniform carbon distribution, and the latter ensures that there is a uniform supply of oxygen. These requirements must be met if uniform regeneration of the catalyst is to be achieved. Conditions which are optimum for good catalyst-catalyst mixing are not optimum for promoting good catalyst-air mixing.

Our inventive concept provides for a riser-mixer containing a relatively dense-phase, turbulent catalyst-catalyst mixer zone, a catalyst-regeneration gas mixing zone, situated above said riser and a combustor zone situated above the catalyst-regeneration gas mixing zone. The catalyst-regeneration gas mixing zone is often referred to herein as a transfer section or transition zone, this being based upon the fact that the catalyst-regeneration gas mixing zone provides a transition from the lower mixer zone to the upper combustor. We have discovered that by providing zones for each of the catalyst-catalyst and catalyst-regeneration gas mixing steps a significantly improved catalyst regeneration is made possible.

Dense-phase, turbulent conditions are maintained in the mixer zone by severely limiting the amount of fluidizing gas which is added to the lowermost portion thereof. Air is preferably used as the fluidizing medium, because it is cheap and readily available and its presence permits some combustion to occur, though it is not essential to use air as the fluidizing medium. A relatively-small-diameter riser is necessary, the riser having a diameter typically one-fourth that of the combustor, to promote intimate mixing of regenerated and spent catalyst in the riser. A significant amount of combustion air is added at the transfer section between the riser and the combustor to promote coke burning.

Intimate mixing of regenerated and spent catalyst occurs in the small diameter, dense bed mixer zone. The spent catalyst is heated by hot regenerated catalyst, so that when spent catalyst contacts combustion air, coke burning readily occurs. In a preferred embodiment the transition zone or transfer section between the mixer zone and the combustor is in the shape of a frustum of a cone or of a funnel, the horizontal cross section of smallest area of which adjoins the mixer zone, wherein the bulk of combustion air is added to the transfer section through holes distributed about the surface of the funnel. When the angle between the center line of the mixer zone and the surface of the funnel is about 45°, fabrication costs are minimized and a venturi acceleration effect is obtained which provides for excellent air and catalyst mixing. Good results can, however, be obtained with other angles. The transition section may comprise a substantially horizontal surface whose outside perimeter is intermediate the outside perimeters of the chamber which comprises the combustor zone and the mixer zone, said horizontal surface containing multiple perforations connective with the regeneration gas inlet, and the mixer zone discharging upwardly past the substantially horizontal surface and into the chamber.

SUMMARY OF THE INVENTION

In one embodiment, the present invention provides a regeneration apparatus for regenerating spent catalyst with a regeneration gas which comprises in combination: (a) a vertical mixer zone having at the lower portion thereof a spent catalyst inlet, and having at the upper portion thereof an outlet for a mixture of spent and regenerated catalyst; (b) a catalyst receiving chamber for containing a relatively dense-phase fluidized bed of catalyst, said chamber having at least twice the diameter of said mixer zone and having at the bottom thereof an inlet means for receiving a mixture of spent and regenerated catalyst, and having a regenerated-catalyst and spent regeneration gas outlet means at the top portion of said chamber whereby catalyst and regeneration gas pass in admixture out of said chamber; (c) a transfer section intermediate said mixer zone and said chamber discharging upwardly from said mixer zone into said chamber, said transfer section containing a regeneration gas inlet at the lowermost portion of the same and above said spent catalyst, said regenerated catalyst and said fluidizing inlets of step (a); (d) a chamber outlet connected to the upper portion of said chamber for removal of regenerated catalyst and spent regeneration gas; (e) a regenerated catalyst receiving zone in communication with said chamber outlet, said receiving zone containing a spent-regeneration-gas outlet means for the withdrawal of spent regeneration gas from the regeneration apparatus, a regenerated-catalyst outlet means for the withdrawal from the regeneration apparatus of a portion of regenerated catalyst and a regenerated-catalyst recycle conduit connected to said mixer zone by means of a regenerated catalyst inlet for the passage of a portion of regenerated catalyst from said receiving zone through said conduit and said inlet to said mixer zone.

BRIEF DESCRIPTION OF THE DRAWINGS

FIG. 3 is an enlarged side view of an embodiment wherein the transfer section comprises a substantially-horizontal surface whose outside perimeter is intermediate the outside perimeters of the chamber and the mixer zone.

FIG. 1 shows a side view of an embodiment of our invention, which basically comprises spent catalyst receiving chamber 1, also designated herein as a combustor, regenerated catalyst receiving chamber 2, transfer conduit 3, mixing conduit 4, transfer section consisting of venturi conduit 5, and regenerated catalyst recycle conduit 6. The combustor, or spent catalyst receiving chamber 1, is a chamber containing a relatively dense-phase fluidized bed of catalyst wherein the majority of coke is oxidized. Transfer conduit 3 connects combustor 1 with regenerated catalyst receiving chamber 2. The regenerated catalyst receiving chamber 2 separates regenerated catayst from flue gas, and contains a dense bed of regenerated catalyst.

Figure 1:
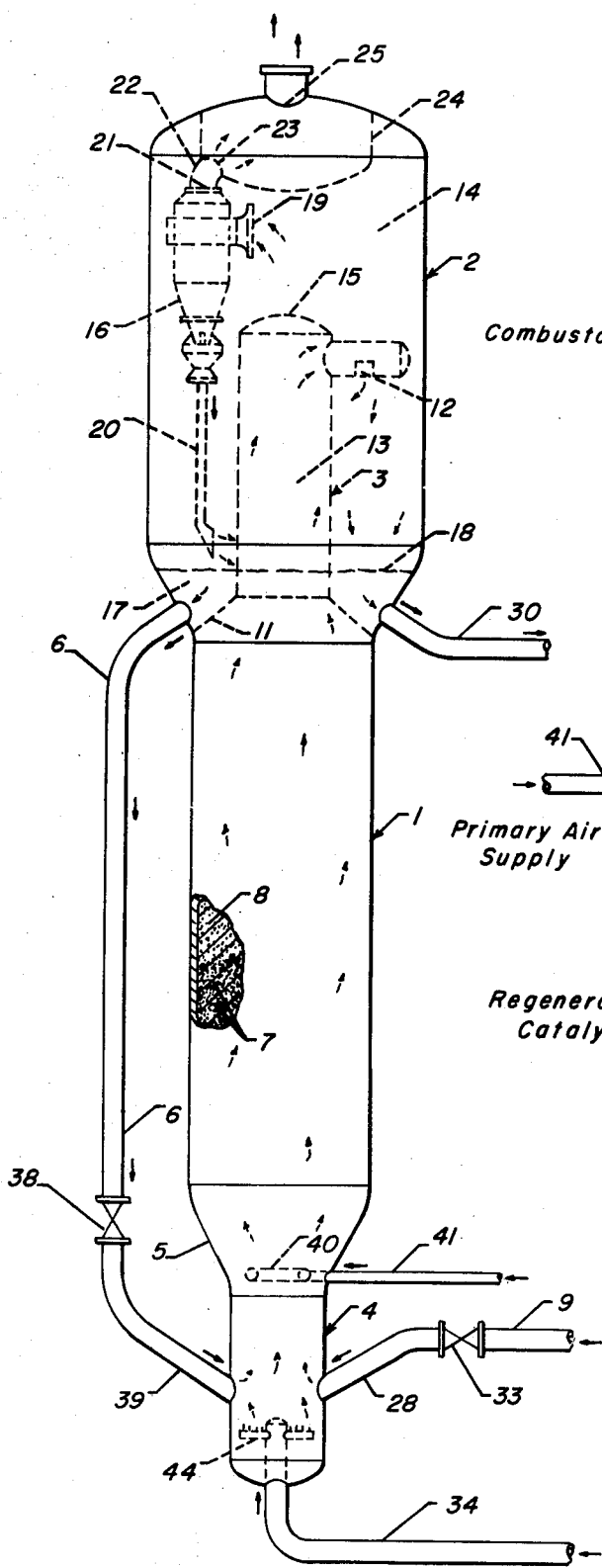
FIG. 1 describes a general embodiment of the apparatus of our invention.

The mixing conduit 4 is a vertical mixer zone for mixing of spent catalyst, hot regenerated catalyst and a limited amount of fluidizing medium, preferably air. Venturi conduit 5 promotes mixing of catalyst with air.

Spent catalyst from an FCC unit, or any other catalytic unit wherein coke is deposited on a solid, particulated catalyst, is charged via line 9, valve 33 and line 28 into the lower portion of mixer zone 4. Hot regenerated catalyst is recycled from the regenerated catalyst receiving chamber via line 6, valve 38, and line 39 into the lower portion of mixer zone 4. A small portion of fluidizing air from line 34 is added to the lower portion of mixer zone 4 via distributor 44. Only a minor portion of the total air required for combustion is added via line 34.

Mixing of the spent and regenerated catalyst, and, to a limited extent, coke oxidation occur in mixer zone 4. Once the regenerated and spent catalysts are mixed together additional combustion air, preferably sufficient to permit complete oxidation of all of the coke on the catalyst, is added via distributor 40 which receives combustion air from line 41. Venturi section 5 promotes mixing of combustion air with catalyst in combustor 1. It is not essential to have a venturi section 5 as a transfer section, but use of such a venturi section promotes uniform mixing of combustion air with catalyst, and also promotes further mixing of spent and regenerated catalyst. The spent and regenerated catalyst have already been fairly well mixed by the time they reach the level of air distributor 40, but additional mixing and contact of hot regenerated catalyst and spent catalyst is still desirable. Most of the coke is burned from the spent catalyst within the intermediate density bed 7, to produce substantially regenerated catalyst which leaves combustor 1 from region 8 via outlet 11 located at the top of the combustor. Outlet 11 is also the inlet to the dilute phase transport riser 3. Catalyst in riser 3 is in dilute-phase bed 13.

Regenerated catalyst is removed from the riser 3 via outlet means 12 which is connected at a separation means whereby catalyst and spent regeneration gas are separated. Separation means which can be used include a disengaging space, as shown in the drawing, or a cyclone separator, or combinations of these. In the embodiment shown in the drawing a disengaging space 14 and cyclone separator 16 are used in combination to separate catalyst from gas. The function of cap 15 at the upper end of riser 3 is to provide a buffer space so that catalyst will not erode the upper end of conduit 3.

Regenerated catalyst receiving chamber 2 contains dilute phase disengaging space 14 and dense-phase catalyst bed 17. Regenerated catalyst passes downwardly from outlet means 12 into dense bed 17 separated from the dilute phase by interface 18. Spent regeneration gas enters cyclone 16 via inlet 19. Substantially catalyst-free gas is removed from cyclone 16 via outlet 21 and passed through line 22 and outlet 23 into plenum chamber 24, and is eventually removed from the system via outlet 25. Regenerated catalyst is removed from cyclone 16 via dip leg 20. Regenerated catalyst is accumulated in dense bed 17 which covers the entire lower space of chamber 2. A portion of hot regenerated catalyst is withdrawn via line 6, valve means 38, and line 39 for addition to mixer zone 4 as previously discussed. Another portion of hot regenerated catalyst is withdrawn via line 30 and valve means not shown to the FCC reactor. It is possible to withdrawn catalyst for recycle to the mixer zone 4 from line 30, or separate means may be provided, as shown, for obtaining catalyst for recycle to the reactor and to the mixer zone.

The flow rate of regenerated catalyst to the riser mixer and the reactor will usually be controlled by slide valves. It is possible to use other means to control catalyst flow, such as providing for recycle of hot regenerated catalyst to mixer zone 4 via a number of open conduits at different elevations in the dense bed of regenerated catalyst. A higher level of catalyst will force more catalyst flow because of increased fluid head. Most refiners prefer the precise control which a slide valve provides, but it is not absolutely necessary.

Similarly, the design shown in FIG. 1 is an excellent design for use in conjunction with an FCC unit wherein complete combustion of CO to $CO_2$ is desired. It is not necessary to operate with complete afterburning of CO, and there may be situations where such complete afterburning must be avoided either because of limits of temperature which can be experienced within the regeneration zone, or perhaps because a refiner has an existing CO boiler which must be used. Even when complete combustion of CO is not required, it is still desirable to have mixing of hot regenerated catalyst with incoming spent catalyst, and the practice of the present invention will permit a more uniform regeneration of catalyst to occur.

The importance and size of the dilute phase transport riser 3 have diminished in recent years. There is a trend among refiners to use a CO-burning promoter. When a promoter is used, very complete combustion of carbon monoxide occurs within combustor 1, and riser conduit 3 primarily serves to transfer catalyst from the combustor to the regenerated catalyst receiving chamber and to effect heat exchange between gas and catalyst. The benefits of the present invention, i.e., better mixing of hot regenerated catalyst with relatively cooler spent catalyst, will be useful whether or not a CO promoter is used. When a CO-combustion promoter is used, it may either be incorporated directly into the catalyst during manufacture, or added to the regenerator in the form of a solid or a liquid solution. The particular type of CO-combustion promoter used is not critical, and forms no part of the present invention.

Figure 2:
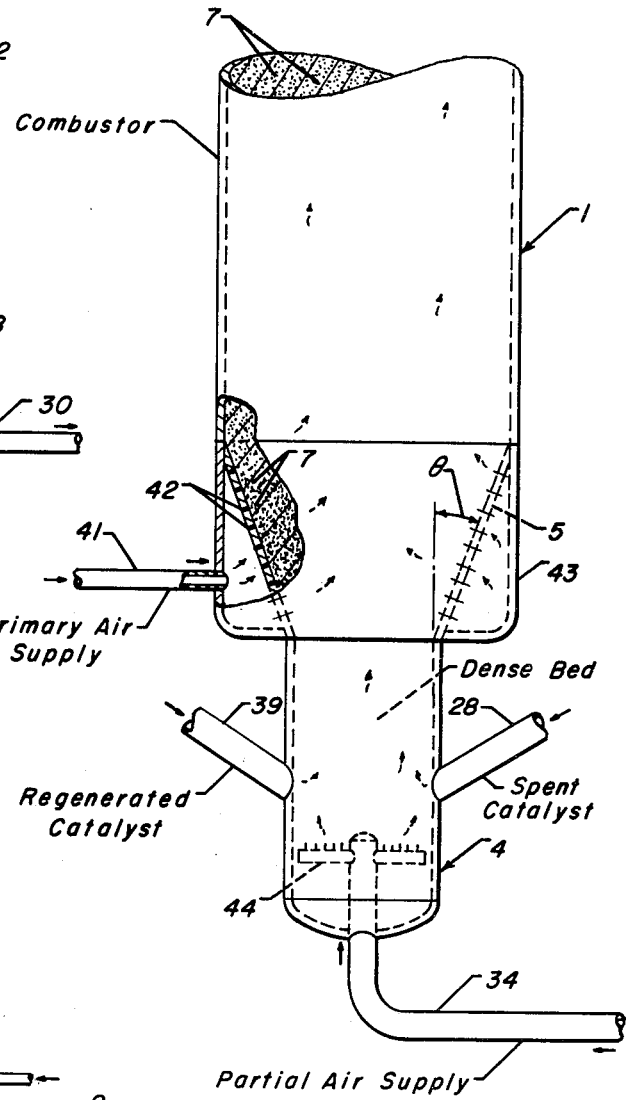
FIG. 2 is an enlarged side view of a preferred embodiment, wherein the transfer section comprises a frustoconical surface, the horizontal cross section of smallest perimeter of which adjoins the outlet of the mixer zone.

FIG. 2 is an enlarged view of a preferred embodiment of the present invention with a mixer zone 4 and a transfer section comprising venturi section 5 leading to the lower portion of combustor 1. The venturi section comprises a frusto-conical surface the horizontal cross section of smallest area of which adjoins the outlet of mixer zone 4. The angle $\theta$ indicated in the drawing should be about 45° to provide an optimum venturi effect. This venturi effect is desirable, but not absolutely essential.

FIG. 2 also shows the use of an air box to add the primary air supply to the regeneration zone. In this embodiment sealed container 43 encompasses the lower portion of venturi section 5 and serves as an air box. Combustion air is added via line 41 to air box 43. Perforations 42 in the sidewalls of venturi section 5 permit combustion air to be added to the mixed catalyst from mixer zone 4. One of the advantages of this construction is that there is no obstruction of the interior of mixer zone 4. It is still preferred to maintain a venturi section by providing an angle of roughly 45° between the center line of the mixer zone and the funnel side, but it is not essential to do so. It would be acceptable to use an air box to add combustion air through perforations in the wall of the upper part of mixer zone 4.

FIG. 3 is an enlarged view of another embodiment of the present invention in which the transfer section comprises substantially-horizontal surface 45. The outside perimeter of surface 45 is intermediate the outside perimeter of chamber 1 and mixer zone 4. Sealed container 43 encompasses an upper portion of mixer zone 4 which discharges upwardly past surface 45 into chamber 1. Combustion air is added via line 41 to sealed container or air box 43. Perforations 46 in surface 45 permit combustion air to be added to the mixed catalyst from mixer zone 4. All other reference numerals in FIG. 3 and the items to which they refer are as set forth in the above description of FIG. 2.

These figures are meant to be illustrative and not limiting.

DESCRIPTION OF THE INVENTION

Reference will now be directed to the process aspects of our invention. To assist in understanding, a number of terms will be briefly defined.

The FCC process contacts a hydrocarbon feed with cracking catalyst in a hydrocarbon-reaction zone to produce product, spent catalyst, and coke. Coke is oxidized from the spent catalyst in a catalyst regeneration zone to restore the catalyst activity and permit its reuse. Spent catalyst means catalyst withdrawn from any hydrocarbon reaction zone, the activity of which catalyst has been reduced by coke deposition thereon. Spent catalyst may contain 0.1 to 5 wt. % carbon, but typically FCC operations produce spent catalyst with 0.5 to 1.5 wt. % carbon. Regenerated catalyst is catalyst from which most of the coke has been removed by oxidation in a regeneration zone. FCC catalyst regenerated by the process of our invention will typically contain about 0.01 to 0.2 wt. % carbon, and usually about 0.01 to 0.1 wt. % carbon. Coke comprises a mixture of carbon and hydrogen deposited on catalyst during its attendance at sites of hydrocarbon conversion reactions. Most of the coke is carbon, but coke can contain from 5 to 15 wt. % hydrogen. The coke content of spent catalyst is almost, but not exactly, equal to the carbon content of a spent catalyst.

Regeneration gas is any gas which contacts catalyst within the regeneration zone. Fresh regeneration gas includes air or oxygen enriched or deficient air. Coke can be oxidized to produce spent or partially-spent regeneration gas. The regeneration gas is "partially-spent" when it contains a reduced concentration of free oxygen as compared to fresh regeneration gas. The CO concentration in partially-spent regeneration gas may range from 0.1 to 15 mole percent, and typically will be 5 to 14 mole percent. Spent regeneration gas has a reduced CO content, compared to partially-spent regeneration gas. Preferably, spent regeneration gas contains less than 1000 ppm CO and typically less than 500 ppm CO. The term "essentially complete combustion of CO" means the CO concentration in spent regeneration gas has been reduced to less than 1000 ppm, preferably less than 500 ppm.

A brief consideration of the design and operation of typical prior art regeneration processes will make the operation and advantages of our process more apparent. In the prior art process, especially in the process described in German OS No. 25 26 839, there is disclosed a device consisting of a combustor or first dense bed, a dilute phase transport riser and a second dense bed for collection of regenerated catalyst. There is provided for recycle of hot regenerated catalyst to the combustor and for mixing of hot regenerated catalyst with incoming spent catalyst in a vertical riser zone upstream of the combustor. This riser will provide some mixing, but the mixing will not be as efficient as in our process. The reason is that in the German OS dilute phase conditions are maintained throughout the riser. We maintain a dense-phase, turbulent bed which promotes mixing. A further improvement of our design over that of the reference is provision of a venturi section at the base of the combustor to promote more intimate mixing of catalyst and air.

In our system the catalyst-catalyst mixing and subsequent air-catalyst mixing are achieved by splitting the air into two locations. In the mixer zone section 4, dense phase operation is maintained by limiting the air velocity so that the superficial velocity is not enough to transport catalyst in the dilute phase. For typical FCC catalyst, superficial velocity required for a dense bed is normally about 0.5-3 ft/sec. However when very much catalyst is present, i.e., the ratio of weight of catalyst per volume of air is high enough, it is possible to run with a superficial velocity greater than 3 ft/sec while still maintaining a dense, turbulent, fluidized bed. The catalyst density will typically be about 25 to 30 pounds/cubic foot. About 0.5 to 2.5 pounds of catalyst will be lifted up through the mixer zone for each standard cubic foot of entering gas. There is nothing novel in these fluidization conditions, they are all within the broadly defined limits of FCC operation, e.g., conventional FCC regenerators operating with a single dense bed of catalyst. We are not aware of any reference disclosing use of our mixer zone as a means of mixing spent and regenerated catalyst upstream of a regenerator.

Spent and regenerated catalyst are mixed in this dense phase riser. The back-mixing which occurs in a dense turbulent bed thoroughly mixes the two catalyst. It is best to minimize the diameter of this section of the process. Minimizing the diameter minimizes the distance that must be traversed by the two catalyst streams in order to achieve good mixing. The diameter of the combustor will usually be at least twice as large as the diameter of the mixer zone.

After the catalysts are mixed, they preferably enter a second mixing stage. In this stage the remainder of the air is injected at the base of, or perhaps throughout, a transition area or transfer section. The transition area may be frusto-conical, that is in the shape of a frustum of a cone, or of similar geometry which allows the catalyst and airstream to gradually spread from the mixer zone diameter to the diameter of the combustor as it ascends from mixer-zone to the combustor. This gradual spreading provides a continuously uniform distribution of air and catalyst which is needed for good regeneration. When maintaining the angle between the center line of the mixer-zone and the side of the venturi section at 20° to 90°, a significant venturi effect will be achieved which will further enhance the mixing of spent and regenerated catalyst, and of catalyst with air. When a 90° angle is used, air should be added across the horizontal portion of the air distributor separating the mixer from the combustor.

An excellent way of adding combustion air to the venturi mixing section is to provide an "air chest" or "air box" around the upper portion of the dense phase mixer zone and throughout the transfer section connecting the mixer zone to the combustor.

Punched holes, or screens, or other equivalent means located around the very top of the mixer zone section in the base of the transfer section will permit easy addition of combustion air to the mixed catalyst from the mixer zone. One of the advantages of this method of adding combustion air, besides its low cost and ease of fabrication, is that there is no obstruction of the catalyst mixture leaving the mixer zone, as would be the case to some extent if any air distributor or air sparger were placed in the path of catalyst flow from the mixer zone.

Conditions within the combustor, dilute phase transport riser, and regenerated catalyst dense bed, are all conventional. The combustor temperature will typically be 1200° to 1400° F., with a superficial regeneration gas velocity of about 3 to 10 ft/sec and a pressure of atmospheric to 50 psig. Residence time within the combustor will usually be less than two minutes. Most of the coke will be oxidized in the combustor.

In the dilute phase transport riser it was believed that most of the CO present in the partially spent regeneration gas was burned to $CO_2$. It is now believed that most CO combustion occurs in the combustor, especially when a CO combustion promoter is used. The amount of CO required to be oxidized to $CO_2$ in the transport riser is also further reduced when the combustor inlet system provides for uniform catalyst temperature and uniform air supply. With less efficient distribution systems in large diameter combustors one side of the zone may contain a higher percentage of regenerated catalyst. This side of the zone will therefore contain less coke but will be at a higher temperature than the other side of the combustor. As a result one side of the combustor will produce a regeneration gas which has been essentially completely oxidized, that is to say the CO will have been completely oxidized to $CO_2$, and this regeneration gas will contain excess oxygen. The other side will provide a regeneration gas which is deficient in oxygen and which contains unoxidized CO. The transport riser provides for the mixing of regeneration gas from various parts of the combustor, and it allows combustion of any residual CO that has resulted from poor mixing of spent and regenerated catalyst or poor mixing of catalyst and air at the inlet of the combustor. Thus, with more efficient mixing systems or the use of CO combustion promoters, or combinations of the two, the importance and size of the dilute phase transport riser have diminished. Temperature in this zone will be about 1250° to 1450° F., with a pressure slightly less than that in the combustor. Superficial gas velocities are preferably 10 to 25 ft/sec.

Regenerated catalyst collected in the second dense bed will usually be around 1250° to 1400° F., in a typical FCC operation. Catalyst temperatures of 1350° F. and higher are usually avoided because of the deactivating effect of high temperatures on the catalyst. The pressure in the second dense bed, wherein regenerated catalyst is collected for recycle to the reactor and to the combustor, will be slightly less than that in the combustor, slightly less because of the pressure drop associated with getting the catalyst and gas through the system. Usually the catalyst is totally regenerated by the time it is in the second dense bed, although it is possible to add additional oxidizing medium into this bed if desired, or to add a combustible substance, such as torch oil, to further heat up the catalyst. Such additives are not normally necessary or desirable. It is also possible to treat the regenerated catalyst with steam, by means not shown in the drawing. Many FCC catalysts are deactivated by such steam treatment, however, and therefore this is not normally practiced.

The ratio of recycled freshly regenerated catalyst to spent catalyst in the mixer zone is an is an important variable in the process. If only a small amount of hot regenerated catalyst is recycled, there will not be sufficient heat transferred to the spent catalyst. Accordingly at least 25% of the material in the mixer zone of our invention should be recycled freshly regenerated catalyst. It is not normally desirable to operate with very large amounts of recycle as such large amounts of recycle tend to distort the actual flow of catalyst through the system and require that the vessels be much larger than is necessary. For this reason the amount of hot regenerated catalyst in mixer zone 4 will not normally exceed 80% of the catalyst inventory in this zone. For most operations, about a 1:1 ratio of fresh to regenerated catalyst will give good results.

ILLUSTRATIVE EMBODIMENT

The best mode contemplated for practicing our invention is as follows; expressed in terms of the dimensions of the regeneration apparatus:

|  | Diameter, ft. | Approx. Length ft. | (Approx.) Gas Superficial Velocity, ft/sec |
|---|---|---|---|
| Regenerated Catalyst Receiving Chamber | 31 | 45 | 2.5 |
| Combustor | 20 | 20 | 6 |
| Mixer zone | 5 | 20 | 2.4 |

The above arrangement will result in approximately 3% of combustion air going to the mixer zone and 97% to the transition zone between the mixer zone and the combustor.

The following differences between our process and conventional ones, such as that described in the German OS with a dilute phase mixer zone upstream of the combustor, may be pointed out:

(1) The density in our mixer zone, ranging from 10 to 40 lbs/ft$^3$, would be much greater than that in a dilute phase riser;

(2) Particle-particle heat transfer, known to take place more rapidly in a dense bed than in a dilute phase, is superior, and therefore a substantially isothermal bed would be established very rapidly in our mixer zone, whereas a dilute phase mixer zone would have a more pronounced temperature gradient;

(3) A dilute phase mixer zone is less efficient at distribution of spent catalyst particles throughout the combustor vessel. Therefore, it is possible to have localized concentrations of carbon where there is more carbon present than there is $O_2$ for its combustion. The solids-mixing efficiency is much higher in a dense phase than a dilute phase, and our system will therefore assure that spent catalyst particles are spread uniformly throughout the combustor, resulting in good carbon—$O_2$ contacting and, therefore, more efficient burning;

(4) Because of more efficient heat transfer, and most of all because of more efficient mixing of spent and regenerated catalyst which occur in our mixer zone, we believe that a decrease in the residence time required in the combustor may be obtained. This could be taken advantage of by making the vessels smaller, which would save significant capital cost of the system, and even more importantly would reduce the catalyst inventory in the regeneration unit. A 10% decrease in the combustor size would reduce total catalyst inventory in a unit by about 5%, meaning that the unit could operate with 5% less daily addition of new catalyst. Alternatively, a refiner could use the residence time margin afforded by the use of the present invention to permit operation in a CO burning mode without the use of a CO burning promoter. Another way that the decreased residence time might be used is to increase the capacity of an existing unit without providing a larger combustor. Thus, as part of an expansion in the capacity of a unit, our mixer zone could be added beneath an existing regenerator to permit increased processing capacity of spent catalyst through the regenerator, with a consequent increase in processing capacity in the fluid catalytic reactor.

Although maintenance of a dense-phase turbulent bed in the mixer zone promotes excellent contact of hot regenerated catalyst with spent catalyst, it may sometimes be desirable to incorporate additional mixing means into the dense-phase riser-mixer. Splitting of each catalyst stream into, e.g., two streams would permit addition of spent and hot regenerated catalyst at four equally spaced radial points in the mixer zone. In a preferred embodiment, the catalyst enters the mixer zone on a tangent, thus imparting a swirling motion to the material in the mixer zone. It may also be desirable to incorporate in this vessel static mixing devices which will cause the catalyst near the edge of the mixer zone to be displaced into the center in the mixer zone. Great care should be taken in selecting the material of construction to be used for such a mixer, because of the extremely abrasive conditions encountered in such service.

It is also within the scope of our invention to operate the process using a CO burning promoter. This promoter can be in the form of a CO-burning promoted catalyst, the promoter being incorporated in the catalyst, or it may be in the form of a solid or liquid additive to the feed to the process or directly to the regeneration zone. When these additives are used their effect will be cumulative with the beneficial effects of the mixer zone and transfer section mixing zone of the present invention.

Although the present invention is especially useful in regenerating fluidized catalytic cracking catalyst, it can also be used to regenerate catalyst from any other process, whether fluidized or not. The process of the present invention will find great utility in regenerating catalyst used in converting heavy residual feed stocks, and will in fact be especially useful in these processes because of the great amounts of carbon deposition which occur when processing these heavy feed stocks. The present invention may also be used to regenerate catalyst from conventional fixed bed processes, i.e., such as the reforming process which uses a noble metal catalyst on a solid particulated alumina support.

The present invention will also improve the operation of FCC regenerators of a more conventional design, i.e., those having one large dense bed wherein regeneration of catalyst occurs. In such regenerators, the single dense bed of catalyst is believed to act as a continuously stirred tank reactor. If the reactor operated perfectly, temperatures and compositions within the bed would be uniform. As FCC technologists know, however, such is rarely the case in a commercial unit as there is usually some maldistribution of catalyst and/or air. This poor distribution has been demonstrated by the color of catalyst samples taken from conventional units which did not operate in a CO-burning mode. The regenerated catalyst had the appearance of a mixture of table salt and black pepper. The light-colored catalyst had been in the regenerator quite a long time and was very low in coke. The dark-colored catalyst had substantially escaped regeneration, and therefore had a relatively higher carbon content. Circulation of regenerated catalyst and spent catalyst through a mixer zone such as contemplated by our invention will greatly improve the dispersion of spent catalyst throughout the regeneration zone and increase the efficiency of the operation. Thus the improved mixing afforded by the practice of the present invention should improve the operation of these conventional units by minimizing the problems of poor catalyst distribution within the regeneration zone. Where our mixer zone is installed beneath a prior art regenerator containing only a single dense bed of catalyst, there is no need to install a dilute phase transport riser.

It is also possible to operate in a CO-burning mode with two relatively dense beds of catalyst connected by a dilute phase transport conduit where the transport conduit is not vertical, but passes the catalyst and gas laterally.

From the foregoing it can be seen that the practice of the present invention permits petroleum refiners to minimize the capital cost of new units, and minimize the amount of catalyst required, both for the initial loading and for daily addition, by incorporating the present invention into the regenerator design. The present invention may be used to advantage in the revamp of existing units to improve the regeneration process and to permit an increase in the processing capacity of the regenerator.

We claim as our invention:

1. A regeneration apparatus for regenerating spent catalyst with a regeneration gas supplied to said apparatus via inlets consisting essentially of a primary and secondary fluidizing gas inlet which comprises a combination of:
   (a) a vertical mixer zone having at the lower portion thereof a spent catalyst inlet, a regenerated catalyst inlet and a secondary fluidizing gas inlet for passage of a minor portion of said fluidizing gas, and having at the upper portion thereof an outlet for passage of a mixture of spent and regenerated catalyst;
   (b) a relatively dense-phase fluidized bed catalyst chamber having at least twice the diameter of said mixer zone and having at the bottom thereof an inlet means for receiving a mixture of spent and regenerated catalyst, and having a regenerated-catalyst and spent regeneration gas outlet means at the top portion of said chamber for removal of regenerated catalyst and spent regeneration gas in admixture from said chamber;
   (c) a frusto-conical transfer section possessing a primary regeneration gas inlet and a relatively dense-phase fluidized bed in open communication with said mixer zone and said chamber discharging upwardly from said mixer zone and upwardly into said chamber, said frusto-conical transfer section having the smallest horizontal cross section perimeter adjacent to said mixer zone outlet and wherein said transfer section possesses multiple perforations at the lowermost portion of the same for passage of a major portion of said regeneration gas, thereby constituting said primary gas inlet, located above said spent catalyst, said regenerated catalyst and said fluidizing gas inlets of said mixer zone;
   (d) a regenerated catalyst receiving zone in communication with said chamber outlet means, said receiving zone containing a spent-regeneration-gas outlet means for the withdrawal of spent regeneration gas from said regeneration apparatus, an upper regenerated-catalyst outlet means for the withdrawal from said regeneration apparatus of a portion of regenerated catalyst and a regenerated-catalyst recycle conduit connected to said mixer zone by means of said regenerated catalyst inlet for the passage of a portion of said regenerated catalyst from said receiving zone through said conduit and said inlet to said mixer zone.

* * * * *